US011707976B2

(12) United States Patent
Jinnai et al.

(10) Patent No.: US 11,707,976 B2
(45) Date of Patent: Jul. 25, 2023

(54) VEHICLE DRIVE APPARATUS

(71) Applicant: AISIN CORPORATION, Aichi (JP)

(72) Inventors: Naoya Jinnai, Kariya (JP); Nozomu Takahashi, Kariya (JP); Hiroaki Sanji, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/685,827

(22) Filed: Mar. 3, 2022

(65) Prior Publication Data

US 2022/0185085 A1 Jun. 16, 2022

Related U.S. Application Data

(62) Division of application No. 17/637,865, filed as application No. PCT/JP2020/036902 on Sep. 29, 2020.

(30) Foreign Application Priority Data

Dec. 26, 2019 (JP) .................................. 2019-237142

(51) Int. Cl.
  *B60K 1/00* (2006.01)
  *F16H 57/02* (2012.01)
  (Continued)

(52) U.S. Cl.
  CPC ................ *B60K 1/00* (2013.01); *B60K 17/12* (2013.01); *B60K 17/16* (2013.01); *B60K 17/165* (2013.01);
  (Continued)

(58) Field of Classification Search
  CPC .......... B60K 1/00; B60K 17/12; B60K 17/16; B60K 2001/001; H02K 7/116; F16H 1/06;
  (Continued)

(56) References Cited

U.S. PATENT DOCUMENTS 7,786,640 B2 *  8/2010  Sada ...................... B60K 6/365
                                                 310/98
8,344,566 B2 *  1/2013  Koshida ................. B60K 6/40
                                                 310/85

(Continued)

FOREIGN PATENT DOCUMENTS

WO    2019/051824 A1    3/2019
WO    2019/098237 A1    5/2019
WO    2019/154685 A1    8/2019

OTHER PUBLICATIONS

Nov. 17, 2020 Search Report issued in International Patent Application No. PCT/JP2020/036902.

(Continued)

*Primary Examiner* — Leslie A Nicholson, III
(74) *Attorney, Agent, or Firm* — Oliff PLC

(57) ABSTRACT

A transmission mechanism is provided with an output gear drivingly coupled to at least one of a pair of output members and placed coaxially with the pair of output members. A direction in which a rotating electrical machine and an inverter device are arranged side by side in an axial view is defined as a first direction. A direction perpendicular to both an axial direction and the first direction is defined as a second direction. A first output member that is one of the pair of output members is placed between the rotating electrical machine and the inverter device in the first direction, at a position in the second direction where both the rotating electrical machine and the inverter device are placed. The output gear is placed in such a manner as to overlap each of the rotating electrical machine and the inverter device in the axial view.

20 Claims, 8 Drawing Sheets

(51) Int. Cl.

| | | |
|---|---|---|
| *F16H 3/72* | (2006.01) | |
| *H02K 7/116* | (2006.01) | |
| *B60K 17/12* | (2006.01) | |
| *B60K 17/16* | (2006.01) | |
| *F16H 1/06* | (2006.01) | |
| *F16H 48/08* | (2006.01) | |
| *B60L 53/10* | (2019.01) | |
| *B60L 53/20* | (2019.01) | |

(52) U.S. Cl.
CPC ............ *B60L 53/10* (2019.02); *B60L 53/20* (2019.02); *F16H 1/06* (2013.01); *F16H 3/728* (2013.01); *F16H 48/08* (2013.01); *F16H 57/02* (2013.01); *H02K 7/116* (2013.01); *B60K 2001/001* (2013.01); *F16H 2057/02034* (2013.01); *F16H 2057/02052* (2013.01)

(58) Field of Classification Search
CPC ........... F16H 48/08; F16H 2057/02034; B60L 53/10; B60L 53/20
USPC ............... 180/65.21, 65.235, 65.24; 475/150
See application file for complete search history.

(56) References Cited

U.S. PATENT DOCUMENTS

| | | | | |
|---|---|---|---|---|
| 8,444,518 B2* | 5/2013 | Tanae | .................... | B60W 10/06 |
| | | | | 475/903 |
| 8,596,395 B2 | 12/2013 | Hirano | | |
| 8,678,118 B2* | 3/2014 | Takenaka | ................. | B60K 6/52 |
| | | | | 180/65.6 |
| 9,358,870 B2* | 6/2016 | Hotta | ....................... | B60K 6/40 |
| 9,539,890 B2* | 1/2017 | Miyazawa | ............. | B60K 6/405 |
| 9,802,470 B2* | 10/2017 | Miyazawa | ............. | B60L 50/16 |
| 9,849,791 B2* | 12/2017 | Suzuki | ................ | F16H 61/0006 |
| 10,008,904 B2* | 6/2018 | Kuramochi | ............ | B60K 6/405 |
| 11,370,407 B2* | 6/2022 | Kawahara | ............ | B60K 17/165 |
| 11,522,416 B2* | 12/2022 | Deng | ................. | H05K 7/20927 |
| 2009/0250275 A1 | 10/2009 | Yoshida | | |
| 2015/0251531 A1 | 9/2015 | Hotta et al. | | |
| 2020/0278020 A1 | 9/2020 | Inoue et al. | | |
| 2020/0280246 A1 | 9/2020 | Deng et al. | | |

OTHER PUBLICATIONS

Aug. 2, 2022 Extended Search Report issued in European Patent Application No. 22161724.4.
Feb. 23, 2023 Notice of Allowance issued in U.S. Appl. No. 17/637,865.
Mar. 1, 2023 Notice of Allowance issued in U.S. Appl. No. 17/685,977.
Mar. 15, 2023 Notice of Allowance issued in U.S. Appl. No. 17/685,955.
Mar. 22, 2023 Notice of Allowance issued in U.S. Appl. No. 17/685,907.
Apr. 19, 2023 Notice of Allowance issued in U.S. Appl. No. 17/685,999.
Apr. 13, 2023 Notice of Allowance issued in U.S. Appl. No. 17/685,921.

* cited by examiner

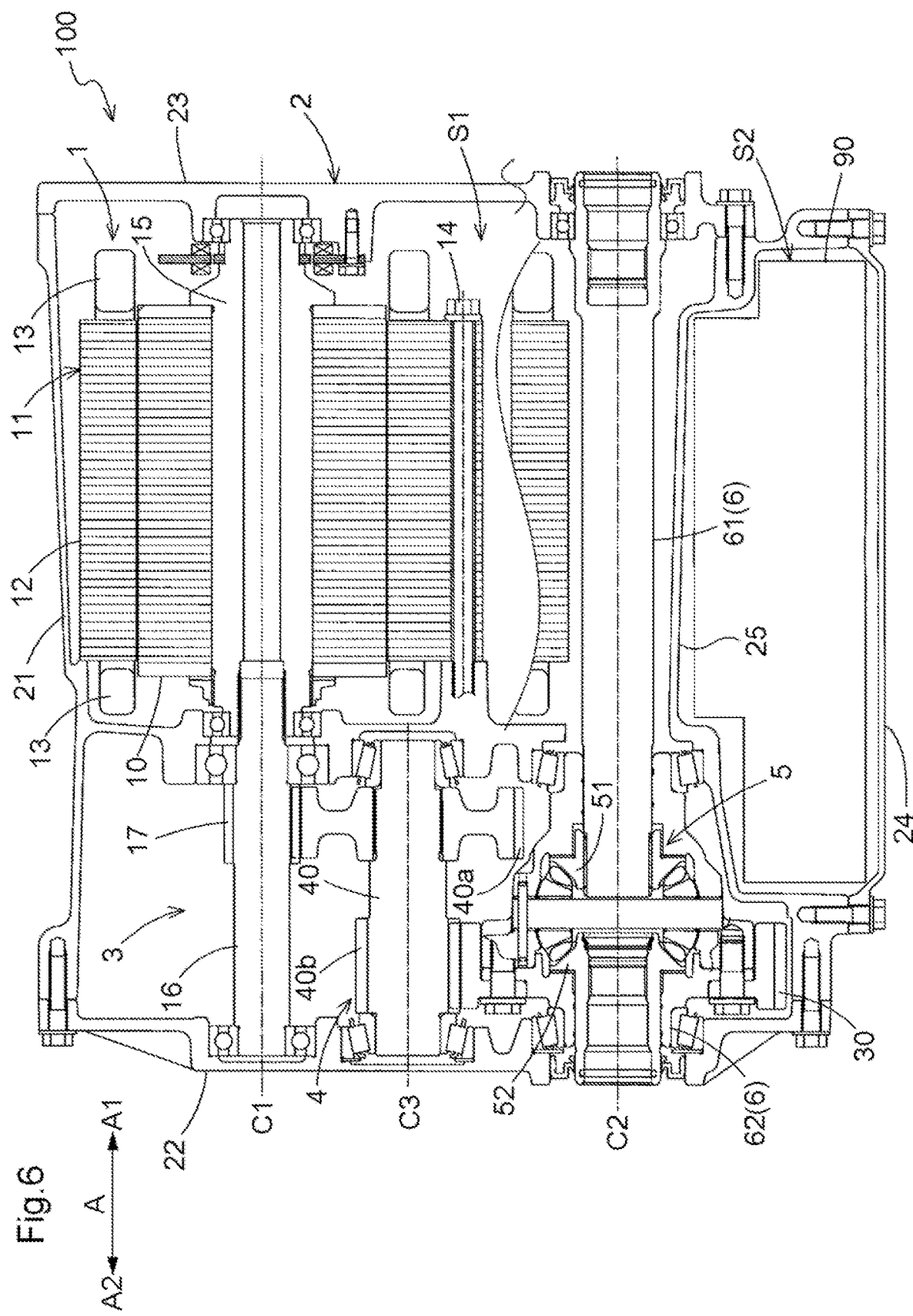

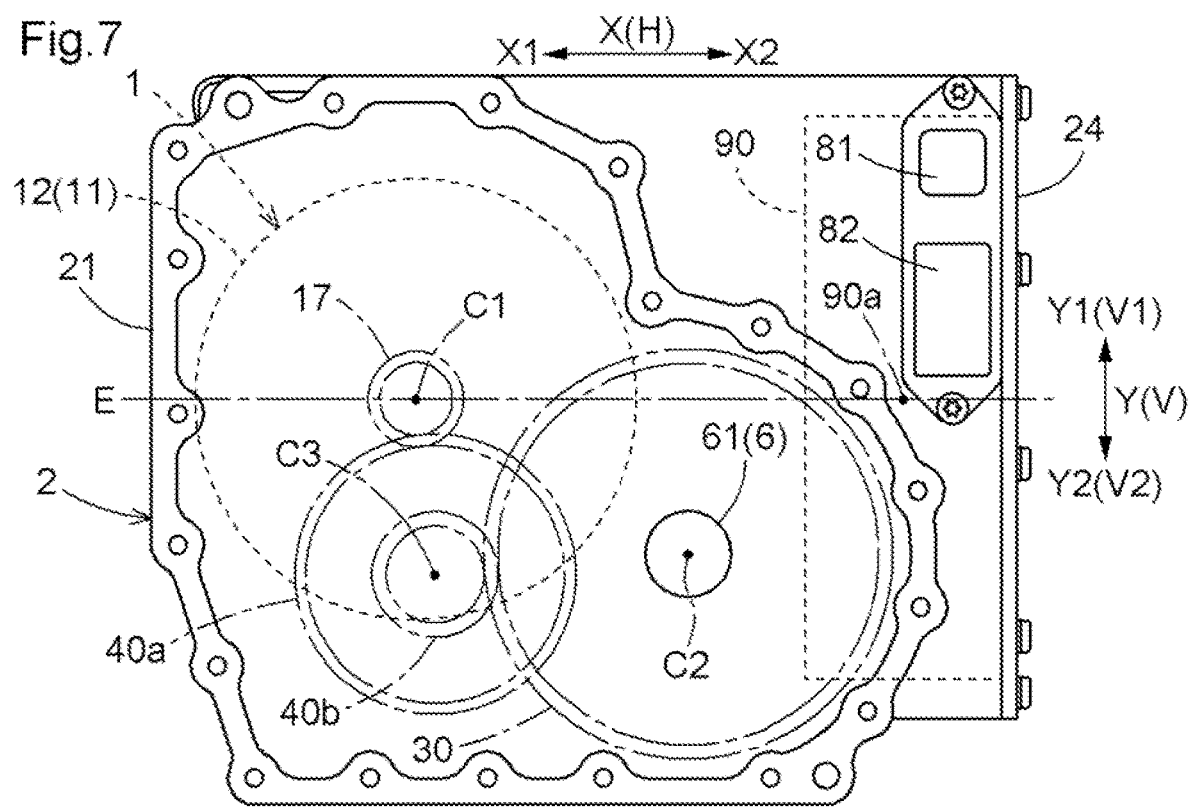
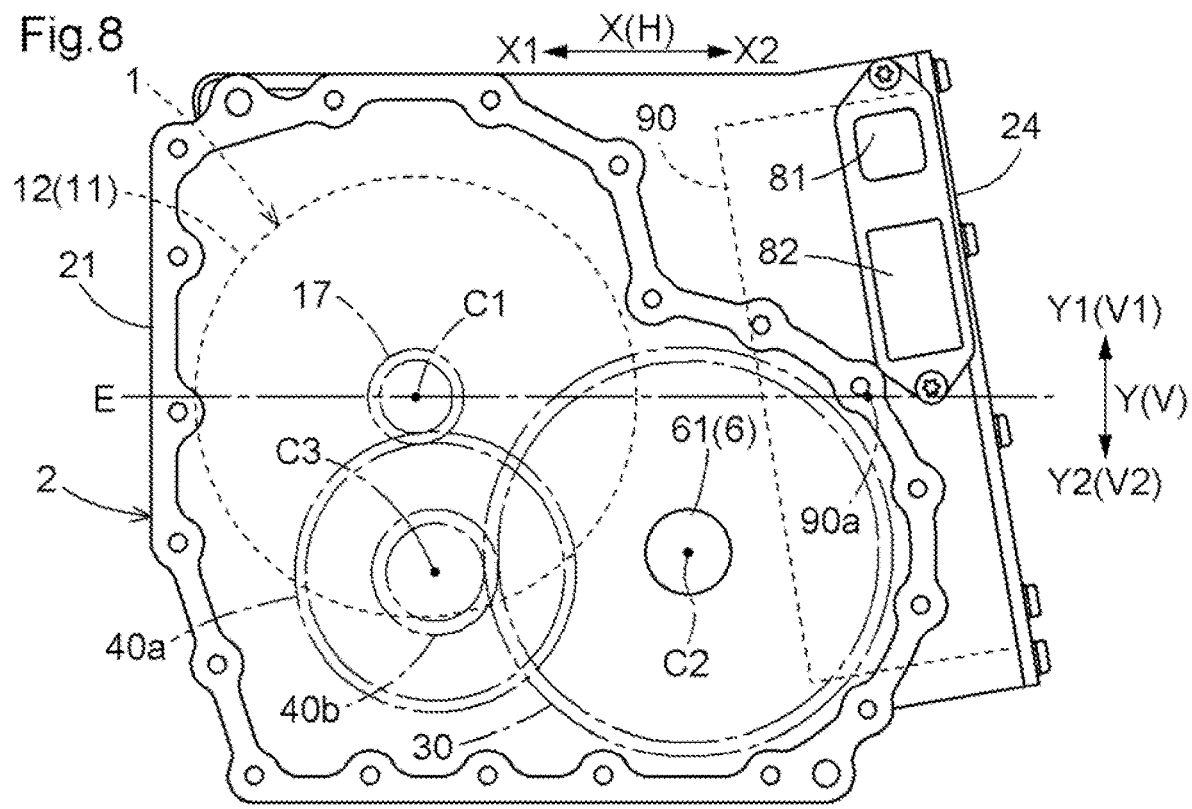

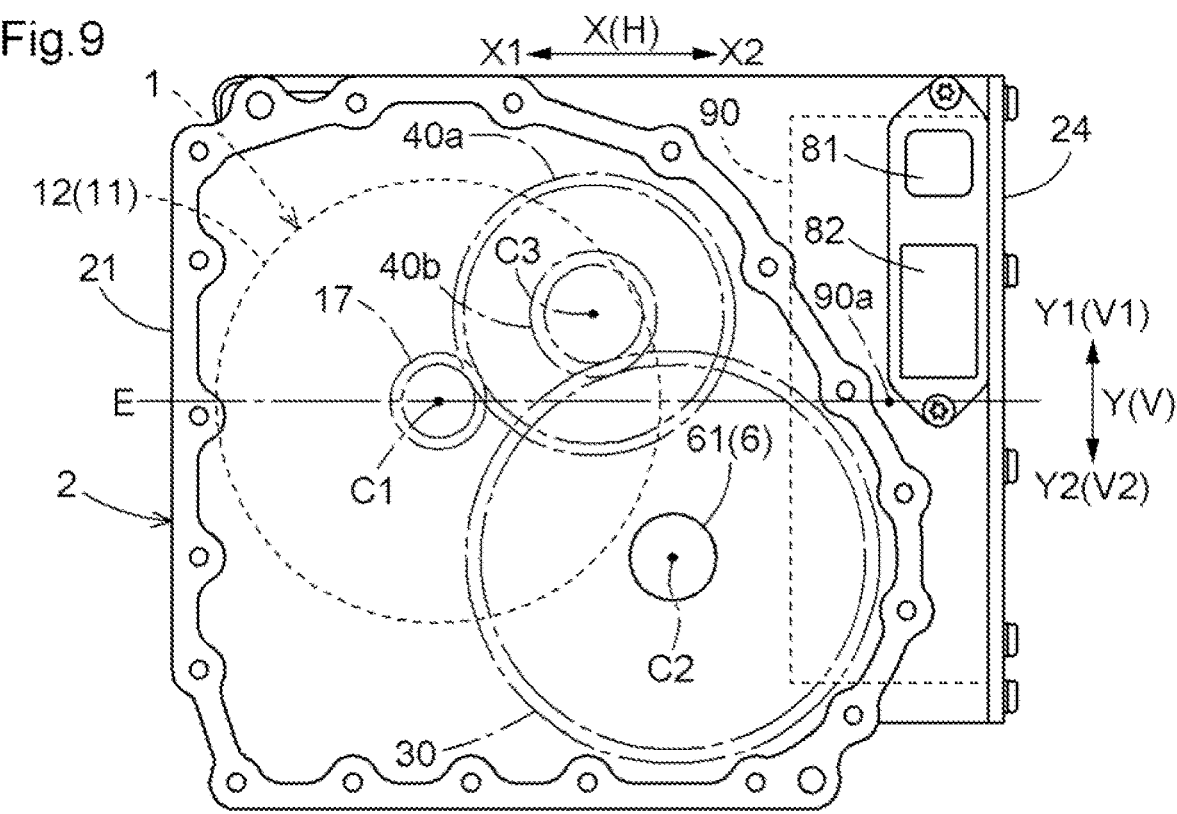
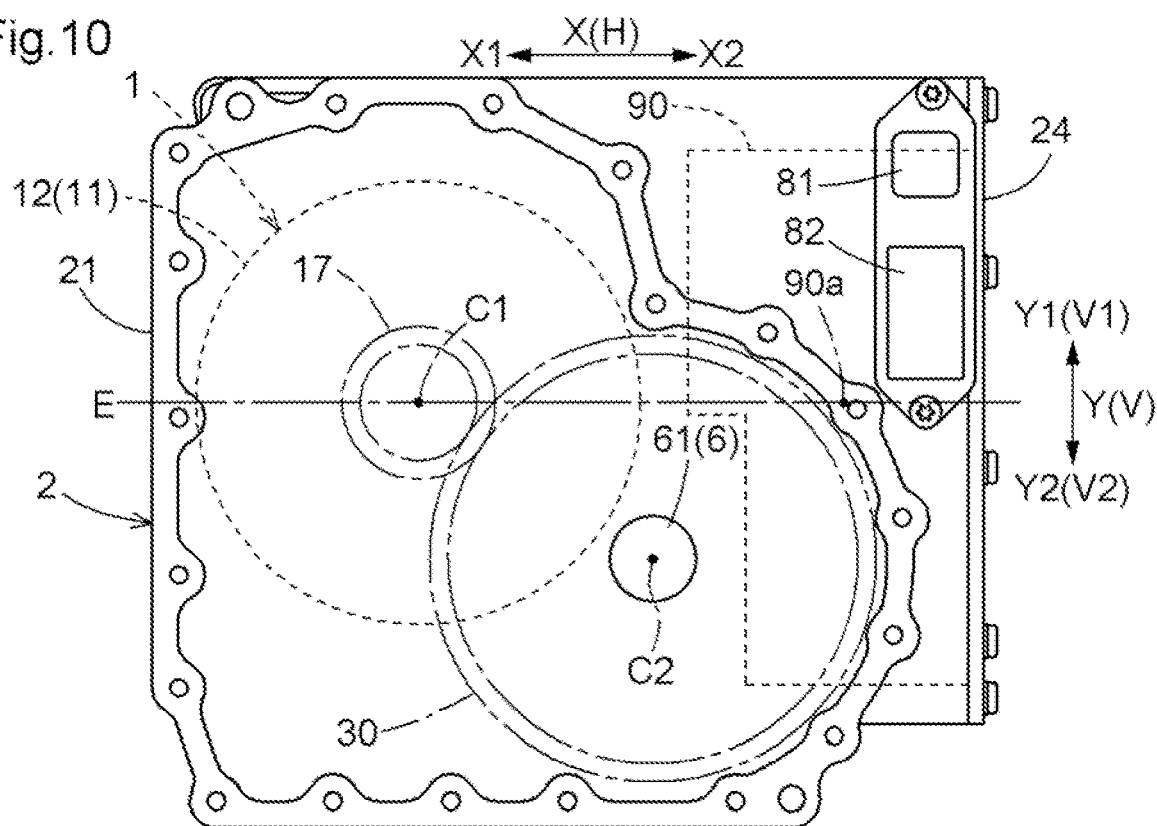

VEHICLE DRIVE APPARATUS

CROSS-REFERENCE TO RELATED APPLICATION

This is a Division of application Ser. No. 17/637,865 filed Feb. 24, 2022, which in turn is a U.S. National Phase of PCT/JP2020/036902, filed Sep. 29, 2020, which claims the benefit of Japanese Patent Application No. 2019-237142 filed Dec. 26, 2019. The disclosure of the prior application is hereby incorporated by reference herein in its entirety.

TECHNICAL FIELD

The present disclosure relates to a vehicle drive apparatus provided with a rotating electrical machine, a transmission mechanism that transmits driving force between the rotating electrical machine and an output member, and an inverter device that controls driving of the rotating electrical machine.

BACKGROUND ART

One example of a vehicle drive apparatus like the one described above is disclosed in WO 2019/154685 (Patent Document 1). Reference signs in parentheses shown hereafter in the description of the background art and the problem are those used in Patent Document 1. An electric drive unit (1) for a vehicle according to Patent Document 1 is provided with an electric motor (3), a transmission apparatus (4) coupled to the electric motor (3), and a power electronic device (5).

RELATED ART DOCUMENTS

Patent Documents

Patent Document 1: WO 2019/154685

SUMMARY OF THE DISCLOSURE

Problem to be Solved by the Disclosure

As illustrated in FIG. 1 and FIG. 6 of Patent Document 1, in the electric drive unit (1) of Patent Document 1, the power electronic device (5) is placed over both the electric motor (3) and the transmission apparatus (4) on the upper side of the drawings. For this reason, in the electric drive unit (1) of Patent Document 1, it is likely that the dimensions of the entire electric drive unit (1) in an axial view are relatively large according to the sum of the respective placement regions of the electric motor (3), the transmission apparatus (4), and the power electronic device (5) in the axial view.

As a result, there is a desire to achieve a technology capable of reducing the dimensions of a vehicle drive apparatus in an axial view.

Means for Solving the Problem

A vehicle drive apparatus according to the present disclosure is provided with: a rotating electrical machine; a pair of output members that are drivingly coupled to a pair of wheels respectively; a transmission mechanism that transmits driving force between the rotating electrical machine and the pair of output members, and an inverter device that controls driving of the rotating electrical machine. The rotating electrical machine and the pair of output members are separately placed on two axes that are parallel to each other. The transmission mechanism is provided with an output gear that is drivingly coupled to at least one of the pair of output members and that is placed coaxially with the pair of output members. A direction in which the rotating electrical machine and the inverter device are arranged side by side in an axial view that is along an axial direction is defined as a first direction. A direction that is perpendicular to both the axial direction and the first direction is defined as a second direction. A first output member that is one of the pair of output members is placed between the rotating electrical machine and the inverter device in the first direction, at a position in the second direction where both the rotating electrical machine and the inverter device are placed. The output gear is placed in such a manner as to overlap each of the rotating electrical machine and the inverter device in the axial view.

According to this structure, the first output member is placed between the rotating electrical machine and the inverter device in the first direction, at the position in the second direction where both the rotating electrical machine and the inverter device are placed. Thus, the respective placement regions, in the second direction, of the rotating electrical machine, the inverter device, and the output gear that is placed coaxially with the first output member overlap each other so that the vehicle drive apparatus can be reduced in size in the second direction. Further, according to this structure, the output gear is placed in such a manner as to overlap each of the rotating electrical machine and the inverter device in the axial view. Thus, while the first output member is placed between the rotating electrical machine and the inverter device in the first direction as described above, a space that overlaps the output gear in the axial view is effectively used to allow the rotating electrical machine and the inverter device to be placed close to each other in the first direction. This permits a reduction in the size of the vehicle drive apparatus in the first direction.

As described above, according to this structure, it is possible to reduce the size of the vehicle drive apparatus both in the first direction and in the second direction, that is, to reduce the dimensions of the vehicle drive apparatus in the axial view. Further, according to this structure, the rotating electrical machine and the inverter device are separately placed on different sides in the first direction with respect to the first output member placed coaxially with the output gear. This makes it easy to increase not only a ratio at which the rotating electrical machine overlaps the output gear in the axial view, but also a ratio at which the inverter device overlaps the output gear in the axial view, thus facilitating a reduction in the dimensions of the vehicle drive apparatus in the axial view.

Other features and advantages of the vehicle drive apparatus will be better understood from the following description of embodiments described in conjunction with drawings.

BRIEF DESCRIPTION OF THE DRAWINGS

FIG. 6 is a cross-sectional view of a vehicle drive apparatus according to another embodiment.

FIG. 7 is a diagram, in an axial view, illustrating the layout of components of a vehicle drive apparatus according to another embodiment.

FIG. 8 is a diagram, in an axial view, illustrating the layout of components of a vehicle drive apparatus according to another embodiment.

FIG. 9 is a diagram, in an axial view, illustrating the layout of components of a vehicle drive apparatus according to another embodiment.

FIG. 10 is a diagram, in an axial view, illustrating the layout of components of a vehicle drive apparatus according to another embodiment.

MODES FOR CARRYING OUT THE DISCLOSURE

Figure 1:
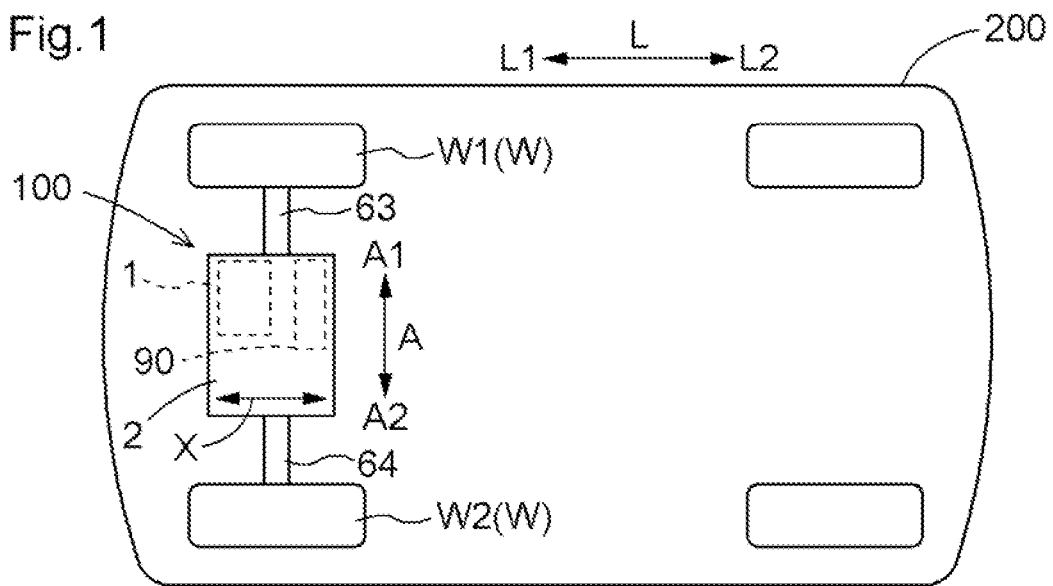
FIG. 1 is a schematic diagram of a vehicle on which a vehicle drive apparatus according to an embodiment is mounted.

An embodiment of a vehicle drive apparatus is described with reference to the drawings. In the description below, a vertical direction V (refer to, for example, FIG. 4) means a vertical direction when a vehicle drive apparatus 100 is used, that is, means a vertical direction when the vehicle drive apparatus 100 is placed in an orientation in which the vehicle drive apparatus 100 is used. The vehicle drive apparatus 100 is mounted on a vehicle 200 (refer to FIG. 1) when used. Therefore, the vertical direction V corresponds to a vertical direction in a state where the vehicle drive apparatus 100 is mounted on the vehicle 200 (referred to hereinafter as the "vehicle-mounted state"), more specifically, corresponds to a vertical direction when the vehicle 200 is at rest on a flat road (a road along a horizontal plane) in the vehicle-mounted state. Further, an upper side V1 and a lower side V2 mean an upper side and a lower side in the vertical direction V, respectively. In addition, the direction of each member described in the description below indicates the direction of the member when assembled in the vehicle drive apparatus 100. Further, terms related to each member, such as the dimensions, the direction of placement, and the location of placement allow differences due to errors (acceptable manufacturing errors).

In the present description, "drivingly coupled" refers to a state where two rotating elements are coupled together such that driving force (synonymous with torque) is transmittable therebetween, including a state where the two rotating elements are coupled in such a manner as to rotate together as a unit, and a state where the two rotating elements are coupled via one or two or more transmission members such that driving force is transmittable therebetween. Such a transmission member includes various types of members that transmit rotation while maintaining or changing the rotation speed (e.g., a shaft, a gear mechanism, a belt, a chain, etc.). The transmission member may include an engagement device (e.g., a friction engagement device, an intermesh engagement device, etc.) that selectively transmits rotation and driving force.

In the present description, "rotating electrical machine" is used as a concept including a motor (an electric motor), a generator (an alternator), and a motor-generator that serves as either a motor or a generator as needed. In addition, the expression "overlap each other in a predetermined direction view" as used in the present description in connection with the placement of two members means that when an imaginary straight line parallel to the direction of the view is moved in directions perpendicular to the imaginary straight line, there is a region where the imaginary straight line crosses both the two members at least in part. Further, the expression "placement regions in a predetermined direction overlap each other" as used in the present description in connection with the placement of two members means that at least part of the placement region of one member in the predetermined direction is included within the placement region of the other member in the predetermined direction.

Figure 3:
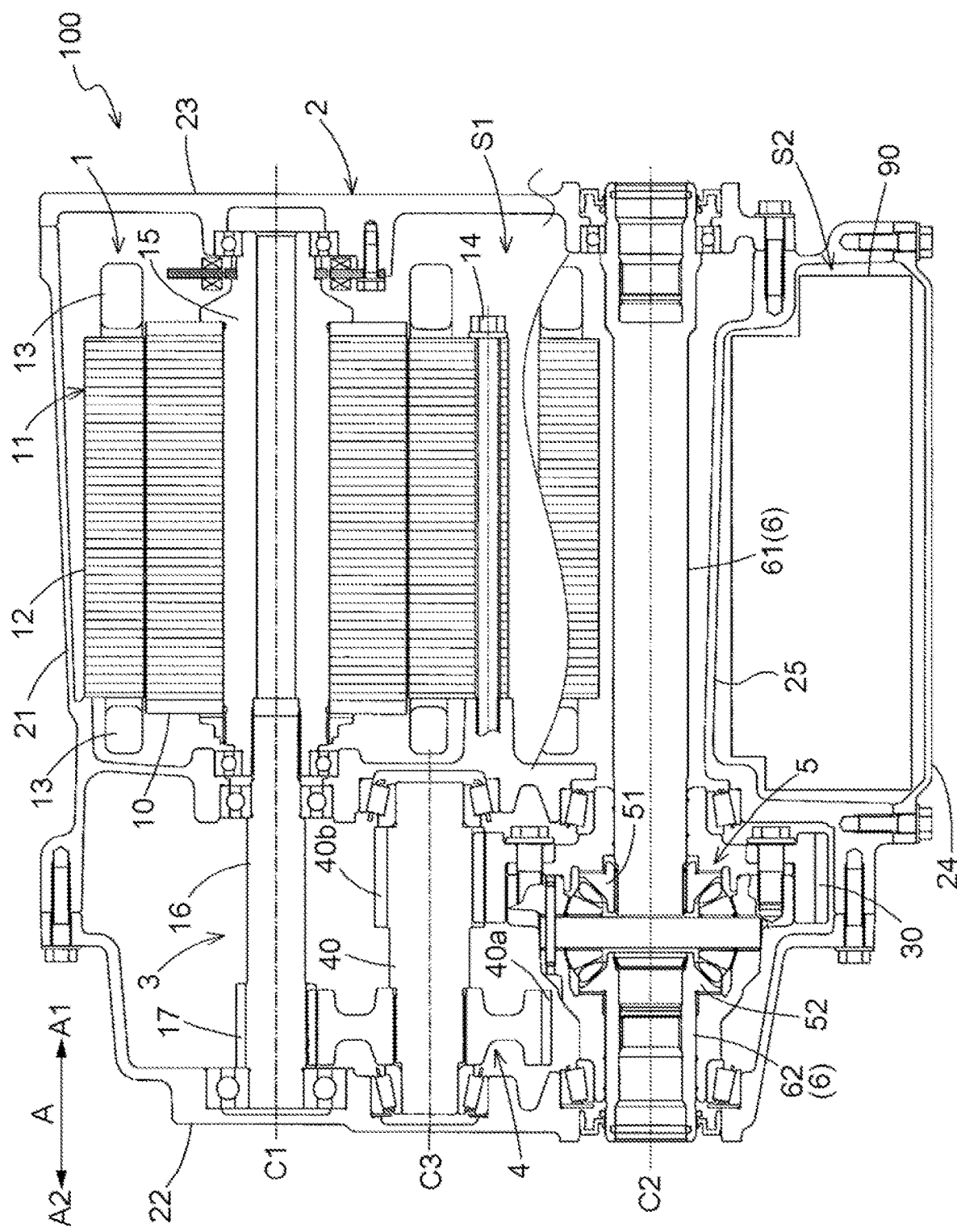
FIG. 3 is a cross sectional view of the vehicle drive apparatus according to the embodiment.

As illustrated in FIG. 3, the vehicle drive apparatus 100 is provided with: a rotating electrical machine 1; a pair of output members 6 that are drivingly coupled to a pair of wheels W (refer to FIG. 1) respectively; a transmission mechanism 3 that transmits driving force between the rotating electrical machine 1 and the pair of output members 6, and an inverter device 90 that controls driving of the rotating electrical machine 1. The vehicle drive apparatus 100 is further provided with a case 2 that houses both the rotating electrical machine 1 and the inverter device 90. The case 2 also houses the pair of output members 6 and the transmission mechanism 3.

A first output member 61 that is one of the pair of output members 6 is drivingly coupled to a first wheel W1 that is one of the pair of wheels W. A second output member 62 that is the other of the pair of output members 6 is drivingly coupled to a second wheel W2 that is the other of the pair of wheels W. As illustrated in FIG. 1, the vehicle 200 on which the vehicle drive apparatus 100 is mounted is provided with a first drive shaft 63 that rotates as a unit with the first wheel W1, and a second drive shaft 64 that rotates as a unit with the second wheel W2. The first drive shaft 63 is coupled via, for example, a constant velocity joint to the first wheel W1, and the second drive shaft 64 is coupled via, for example, a constant velocity joint to the second wheel W2. Further, the first output member 61 is coupled to the first drive shaft 63 in such a manner as to rotate as a unit with the first drive shaft 63, and the second output member 62 is coupled to the second drive shaft 64 in such a manner as to rotate as a unit with the second drive shaft 64.

The vehicle drive apparatus 100 transmits output torque of the rotating electrical machine 1 to the pair of wheels W via the pair of output members 6, thereby moving the vehicle 200 on which the vehicle drive apparatus 100 is mounted. That is, the rotating electrical machine 1 is a source of driving force for the pair of wheels W. The pair of wheels W are a pair of left and right wheels of the vehicle 200 (for example, a pair of left and right front wheels or a pair of left and right rear wheels). According to the present embodiment, the rotating electrical machine 1 is an alternating-current rotating electrical machine that is driven by three-phase alternating current (one example of multiphase alternating current). The rotating electrical machine 1 is electrically connected to an electricity storage device, such as a battery or a capacitor, via the inverter device 90 that performs power conversion between direct-current power and alternating-current power. The rotating electrical machine 1 performs powering by receiving power supply from the electricity storage device or charges the electricity storage device by supplying the electricity storage device with electric power that is generated, for example, by the inertia force of the vehicle 200.

As illustrated in FIG. 3, the rotating electrical machine 1 and the pair of output members 6 are separately placed on two axes (specifically, a first axis C1 and a second axis C2) that are parallel to each other. Specifically, the rotating electrical machine 1 is placed on the first axis C1, and the pair of output members 6 are placed on the second axis C2 different from the first axis C1. The first axis C1 and the second axis C2 are axes (imaginary axes) parallel to each other. The transmission mechanism 3 is provided with an output gear 30 that is drivingly coupled to at least one of the pair of output members 6 and that is placed coaxially with the pair of output members 6 (i.e., on the second axis C2). According to the present embodiment, the first axis C1 corresponds to "a rotational axis of a rotating electrical machine", and the second axis C2 corresponds to "a rotational axis of an output gear" and "a rotational axis of a first output member".

As illustrated in FIG. 1, the vehicle drive apparatus 100 is mounted on the vehicle 200 in such an orientation that an axial direction A is along a vehicle lateral direction. The axial direction A is a direction parallel to both the first axis C1 and the second axis C2, namely, a common axial direction between the first axis C1 and the second axis C2. That is, the axial direction A is a direction in which a rotational axis of the rotating electrical machine 1 extends and is also a direction in which a rotational axis of the pair of output members 6 extends. Here, one side in the axial direction A is referred to as an axial first side A1, and the other side in the axial direction A (the side opposite to the axial first side A1 in the axial direction A) is referred to as an axial second side A2. The axial first side A1 is a side where the rotating electrical machine 1 is placed with respect to the transmission mechanism 3 in the axial direction A. As illustrated in FIG. 3, the first output member 61 is the output member 6 of the pair of output members 6 that is placed on the axial first side A1, and the second output member 62 is the output member 6 of the pair of output members 6 that is placed on the axial second side A2.

As illustrated in FIG. 1, according to the present embodiment, the vehicle drive apparatus 100 is mounted on the vehicle 200 in such an orientation that the axial first side A1 corresponds to the vehicle right and that the axial second side A2 corresponds to the vehicle left. Thus, the first wheel W1 to which the first output member 61 is drivingly coupled is a right wheel, and the second wheel W2 to which the second output member 62 is drivingly coupled is a left wheel. FIG. 1 assumes that the vehicle drive apparatus 100 is a drive apparatus for front-wheel drive that drives a pair of left and right front wheels. For this reason, in the example shown in FIG. 1, the first wheel W1 is a right front wheel, and the second wheel W2 is a left front wheel.

As illustrated in FIG. 3, the rotating electrical machine 1 is provided with a rotor 10 and a stator 11. The stator 11 is fixed to the case 2, and the rotor 10 is supported by the case 2 in such a manner as to be rotatable with respect to the stator 11. According to the present embodiment, the stator 11 is fixed to the case 2 using a fastening member 14, such as a fastening bolt. Further, according to the present embodiment, the rotating electrical machine 1 is an inner-rotor-type rotating electrical machine, and the rotor 10 is placed inside the stator 11 in a radial direction so as to overlap the stator 11 in a radial view that is along the radial direction. The radial direction here refers to a radial direction with reference to the first axis C1, that is, refers to a radial direction with reference to the rotational axis of the rotating electrical machine 1.

The stator 11 is provided with a stator core 12 and a coil end portion 13 that protrudes from the stator core 12 in the axial direction A. A coil is wound on the stator core 12, and a portion of the coil that protrudes from the stator core 12 in the axial direction A forms the coil end portion 13. The coil end portion 13 is formed at each side of the stator core 12 in the axial direction A. According to the present embodiment, the stator core 12 is provided with a body portion that is formed in the shape of a cylinder extending in the axial direction A, and a protruding portion that is formed on the body portion in such a manner as to protrude outward in the radial direction (in the radial direction with reference to the first axis C1). An insertion hole through which the fastening member 14 that fixes the stator core 12 to the case 2 is inserted is formed in the protruding portion.

As illustrated in FIG. 3, the transmission mechanism 3 is provided with an input member 16 that is drivingly coupled to the rotating electrical machine 1 and that is located coaxially with the rotating electrical machine 1 (i.e., on the first axis C1). According to the present embodiment, the input member 16 is coupled to the rotor 10 in such a manner as to rotate as a unit with the rotor 10. In the example shown in FIG. 3, the vehicle drive apparatus 100 is provided with a rotor shaft 15 to which the rotor 10 is fixed, and the input member 16 is coupled to the rotor shaft 15 in such a manner as to rotate as a unit with the rotor shaft 15. Specifically, a portion of the input member 16 on the axial first side A1 is coupled (here, splined) to a portion of the rotor shaft 15 on the axial second side A2. Unlike this structure, the vehicle drive apparatus 100 may be provided with no rotor shaft 15, and the rotor 10 may be fixed to the input member 16 (specifically, a portion of the input member 16 on the axial first side A1).

As illustrated in FIG. 3, according to the present embodiment, the transmission mechanism 3 is provided with a differential gear mechanism 5. The differential gear mechanism 5 distributes driving force transmitted from the rotating electrical machine 1, to the pair of output members 6. According to the present embodiment, the differential gear mechanism 5 is placed coaxially with the pair of output members 6 (i.e., on the second axis C2) and distributes driving force transmitted from the rotating electrical machine 1 to the output gear 30, to the pair of output members 6. That is, according to the present embodiment, the output gear 30 is drivingly coupled to each of the pair of output members 6 via the differential gear mechanism 5. According to the present embodiment, the differential gear mechanism 5 is a bevel-gear-type differential gear mechanism, and the output gear 30 is coupled to a differential case portion of the differential gear mechanism 5 in such a manner as to rotate as a unit with the differential case portion. The differential gear mechanism 5 distributes rotation of the output gear 30 to a first side gear 51 and a second side gear 52. The differential gear mechanism 5 is placed on the axial second side A2 with respect to the rotating electrical machine 1.

The first side gear 51 rotates as a unit with the first output member 61, and the second side gear 52 rotates as a unit with the second output member 62. According to the present embodiment, the first side gear 51 is formed to a member (here, a shaft member) separate from a member that structures the first output member 61, and is coupled (here, splined) to the first output member 61 in such a manner as to rotate as a unit with the first output member 61. At least a portion of the first output member 61 on the axial first side A1 is formed in the shape of a tube (specifically, in the shape of a cylinder) extending in the axial direction A, and the first drive shaft 63 (refer to FIG. 1) is inserted from the axial first side A1 into the inside (a space enclosed by the inner circumferential surface) of the first output member 61. Further, according to the present embodiment, the second side gear 52 is formed on a member (here, a shaft member) that structures the second output member 62. Specifically, the second side gear 52 is formed on an end portion of the second output member 62 on the axial first side A1. At least a portion of the second output member 62 on the axial second side A2 is formed in the shape of a tube (specifically, in the shape of a cylinder) extending in the axial direction A, and the second drive shaft 64 (refer to FIG. 1) is inserted from the axial second side A2 into the inside (a space enclosed by the inner circumferential surface) of the second output member 62.

As illustrated in FIG. 3, according to the present embodiment, the transmission mechanism 3 is provided with a counter gear mechanism 4 in a force transmission path between the rotating electrical machine 1 and the output gear 30. The counter gear mechanism 4 is placed on a third axis C3 that is different from the first axis C1 and the second axis C2. The third axis C3 is an axis (an imaginary axis) parallel to the first axis C1 and the second axis C2. According to the present embodiment, the counter gear mechanism 4 is provided with: a counter input gear 40a in mesh with an input gear 17 that rotates as a unit with the input member 16; a counter output gear 40b in mesh with the output gear 30, and a counter shaft 40 that couples the counter input gear 40a and the counter output gear 40b together. The input gear 17 is placed on the axial second side A2 with respect to the rotating electrical machine 1, and the counter gear mechanism 4 is placed on the axial second side A2 with respect to the rotating electrical machine 1. According to the present embodiment, the counter input gear 40a is placed on the axial second side A2 with respect to the counter output gear 40b. According to the present embodiment, the third axis C3 corresponds to "a rotational axis of a counter gear mechanism".

According to the present embodiment, the counter input gear 40a is formed to be larger in diameter than the input gear 17, and the counter output gear 40b is formed to be smaller in diameter than the output gear 30. Thus, the rotation of the input member 16 is reduced in speed in accordance with the gear ratio between the input gear 17 and the counter input gear 40a, is then further reduced in speed in accordance with the gear ratio between the counter output gear 40b and the output gear 30 (i.e., subjected to a double reduction in speed), and is then transmitted to the output gear 30.

Figure 2:
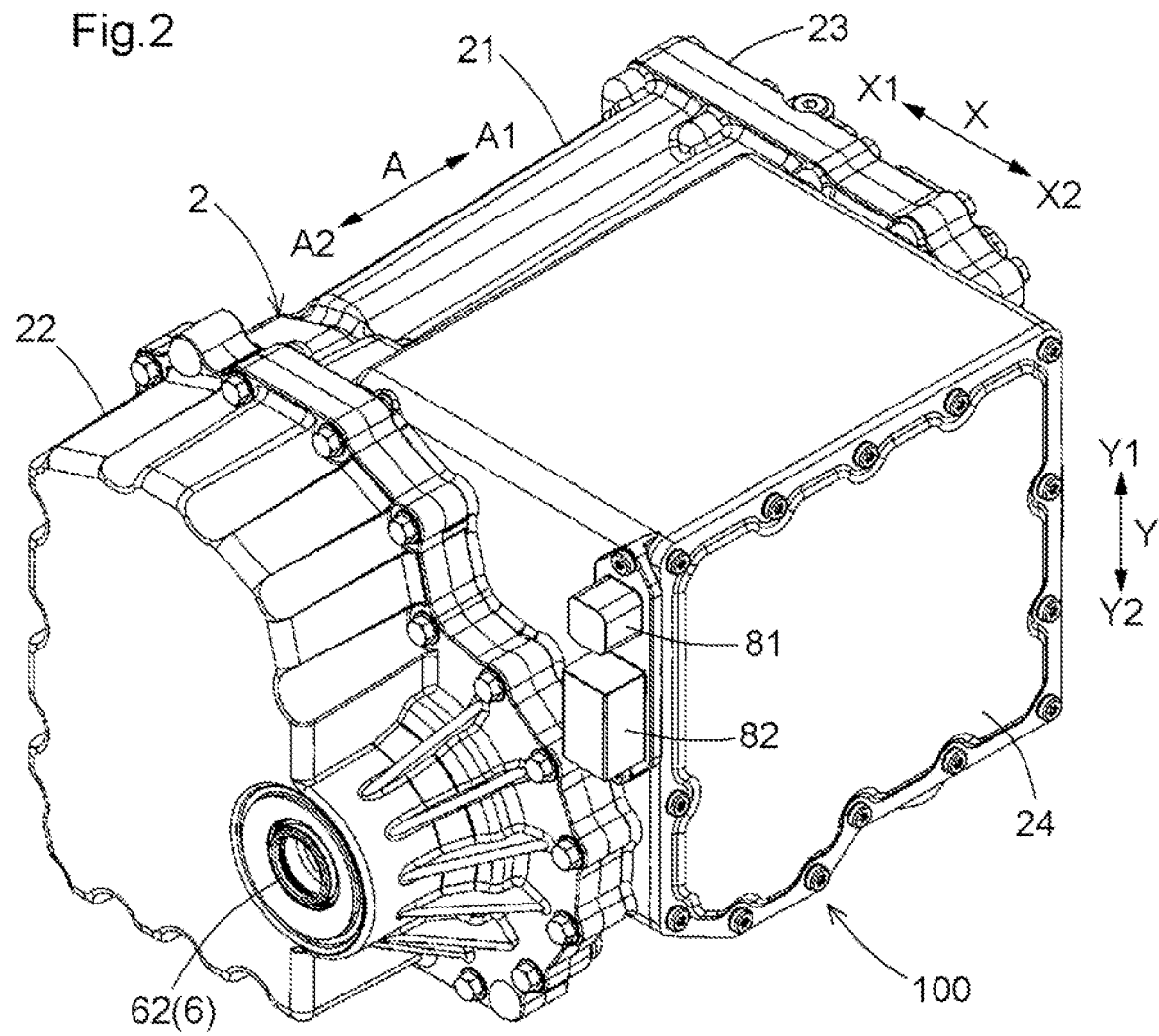
FIG. 2 is a perspective view of the vehicle drive apparatus according to the embodiment.

As illustrated in FIG. 2 and FIG. 3, according to the present embodiment, the case 2 is provided with a first case portion 21, a second case portion 22, and a third case portion 23. The second case portion 22 is joined to the first case portion 21 on the axial second side A2, and the third case portion 23 is joined to the first case portion 21 on the axial first side A1. The rotating electrical machine 1 is held in a space enclosed by the first case portion 21 and the third case portion 23, and the transmission mechanism 3 is held in a space enclosed by the first case portion 21 and the second case portion 22. In this way, the case 2 is provided with a first holding chamber S1 that holds the rotating electrical machine 1, and another holding chamber that holds the transmission mechanism 3. The holding chambers form holding spaces in which objects to be held are held. According to the present embodiment, the first output member 61 is held in the first holding chamber S1. Specifically, at least a portion of the first output member 61 that overlaps the rotating electrical machine 1 in the axial direction A (a portion that has an overlapping placement region in the axial direction A) is held in the first holding chamber S1. Like this, according to the present embodiment, the rotating electrical machine 1 and the first output member 61 are held in a common holding chamber (specifically, the first holding chamber S1) that the case 2 has. According to the present embodiment, the first holding chamber S1 corresponds to "a holding chamber".

According to the present embodiment, the case 2 is further provided with a second holding chamber S2 that holds the inverter device 90. Specifically, the case 2 is provided with a fourth case portion 24 joined to the first case portion 21, and the inverter device 90 is held in a space (the second holding chamber S2) enclosed by the first case portion 21 and the fourth case portion 24. The inverter device 90 is held in the second holding chamber S2 while fixed to the case 2 by a bolt or the like. According to the present embodiment, the second holding chamber S2 is formed in the first case portion 21 in such a manner as to have an opening facing a first-direction second side X2 (refer to FIG. 2) that is described later, and the fourth case portion 24 is jointed to the first case portion 21 in such a manner as to close the opening. Although not described in detail, the inverter device 90 is provided with: a switching element unit (a power module) having multiple switching elements that structure an inverter circuit; a control board on which a control device that controls the inverter circuit is mounted, and a smoothing capacitor that smooths a voltage between positive and negative direct-current terminals of the inverter circuit. The switching element unit, the control board, and the smoothing capacitor are held in the second holding chamber S2. In this way, according to the present embodiment, the first holding chamber S1 and the second holding chamber S2 are integrally formed with the single case 2.

As illustrated in FIG. 3, the case 2 is provided with a partition wall 25 (a separation wall) that separates the first holding chamber S1 and the second holding chamber S2 from each other. According to the present embodiment, the first holding chamber S1 and the second holding chamber S2 are integrally formed with the case 2 (here, the first case portion 21). Specifically, the first holding chamber S1 and the second holding chamber S2 are formed in a single member (for example, a one-piece member made of the same material by die-casting). Further, according to the present embodiment, the first holding chamber S1 and the second holding chamber S2 are separated from each other by the single partition wall 25.

As illustrated in FIG. 2, according to the present embodiment, the case 2 is provided with a first connector 81 and a second connector 82. The first connector 81 and the second connector 82 here are low-voltage connectors. For example, a power line for supplying electric power to the control board of the inverter device 90 and a signal line for transmitting a control signal to the control board may be connected to the first connector 81 and the second connector 82. Although not illustrated in the drawings, the case 2 is further provided with a high-voltage connector to which a power line for supplying electric power to the inverter circuit of the inverter device 90 is connected.

Figure 4:
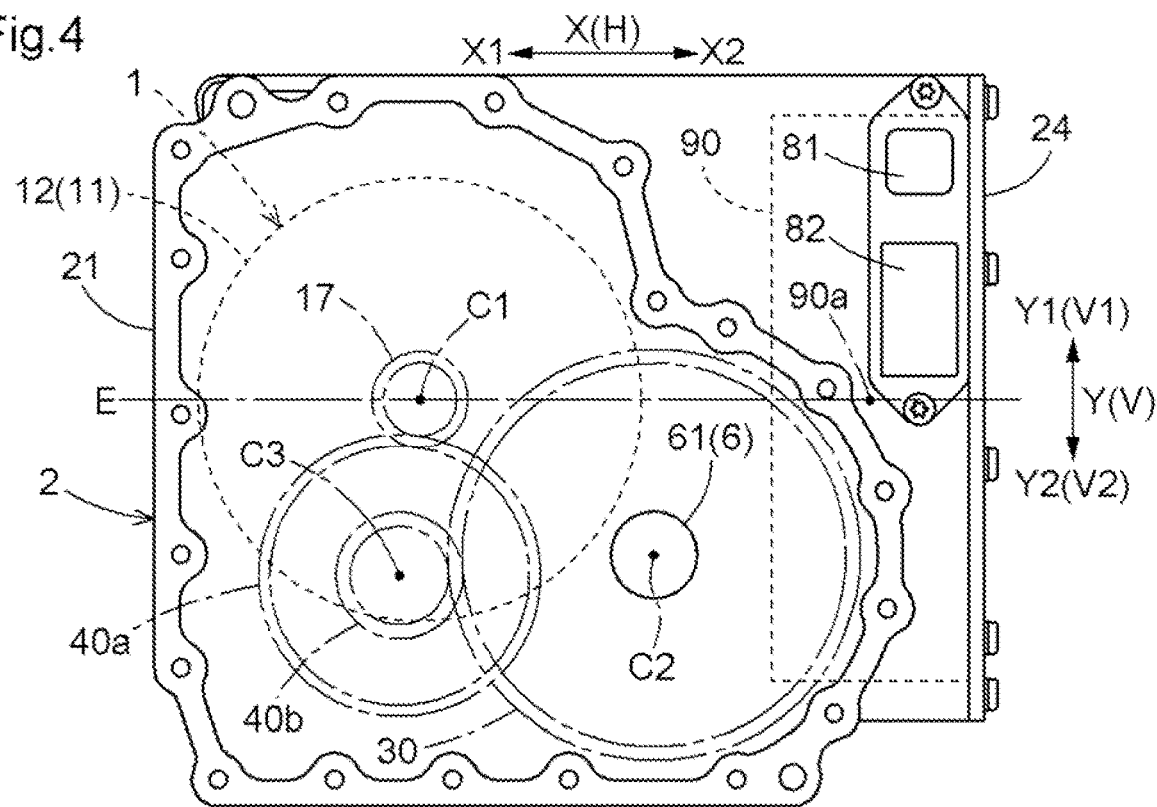
FIG. 4 is a diagram, in an axial view, illustrating the layout of components of the vehicle drive apparatus according to the embodiment.

Here, as illustrated in FIG. 4, a direction in which the rotating electrical machine 1 and the inverter device 90 are arranged side by side in an axial view that is along the axial direction A is defined as a first direction X, and a direction that is perpendicular to both the axial direction A and the first direction X is defined as a second direction Y Further, one side in the first direction X is defined as a first-direction first side X1, the other side in the first direction X (the side opposite to the first-direction first side X1 in the first direction X) is defined as a first-direction second side X2, one side in the second direction Y is defined as a second-direction first side Y1, and the other side in the second direction Y (the side opposite to the second-direction first side Y1 in the second direction Y) is defined as a second-direction second side Y2. The first-direction first side X1 is a side where the rotating electrical machine 1 is placed with respect to the inverter device 90 in the first direction X. In FIG. 4, and in FIGS. 7 to 10 and FIG. 12 that are referred to later, an outer perimeter surface of the stator core 12 (specifically, the body portion described above) is represented by a dashed line, a root circle and a tip circle of each gear are represented by a long dashed short dashed line, and an outer perimeter surface of the first output member 61 (specifically, an outer perimeter surface of a portion of the first output member 61 that is placed between the rotating electrical machine 1 and the inverter device 90 in the first direction X) is represented by a continuous line.

According to the present embodiment, the vehicle drive apparatus 100 is mounted on the vehicle 200 in such an orientation that the second-direction first side Y1 corresponds to the upper side V1 and that the second-direction second side Y2 corresponds to the lower side V2. Further, according to the present embodiment, the vehicle drive apparatus 100 is mounted on the vehicle 200 in such an orientation that the first-direction first side X1 corresponds to a front side L1 (a front side in a vehicle front-rear direction L) and that the first-direction second side X2 corresponds to a rear side L2 (a rear side in the vehicle front-rear direction L). As illustrated in FIG. 1, according to the present embodiment, the vehicle drive apparatus 100 is mounted on the front side L1 with respect to a middle portion of the vehicle 200 in the vehicle front-rear direction L. Thus, the first-direction second side X2, which is the side where the inverter device 90 is placed with respect to the rotating electrical machine 1 in the first direction X and that corresponds to the rear side L2 according to the present embodiment, corresponds to a middle side in the vehicle front-rear direction L. Therefore, according to the present embodiment, in the vehicle-mounted state, the inverter device 90 is placed on the middle side in the vehicle front-rear direction L with respect to the rotating electrical machine 1. It is noted that if the vehicle drive apparatus 100 is mounted on the rear side L2 with respect to the middle portion of the vehicle 200 in the vehicle front-rear direction L, it is possible to place the inverter device 90 on the middle side with respect to the rotating electrical machine 1 in the vehicle front-rear direction L by mounting the vehicle drive apparatus 100 on the vehicle 200 in such an orientation that the first-direction first side X1 corresponds to the rear side L2 and that the first-direction second side X2 corresponds to the front side L1. When the vehicle drive apparatus 100 is mounted on the rear side L2 with respect to the middle portion of the vehicle 200 in the vehicle front-rear direction L as described above, the pair of wheels W to be driven by the vehicle drive apparatus 100 may be, for example, a pair of left and right rear wheels.

When the vehicle 200 is provided with a pair of left and right front wheels and a pair of left and right rear wheels, of the pair of left and right front wheels and the pair of left and right rear wheels, the one not to be driven by the vehicle drive apparatus 100 (in the example shown in FIG. 1, the pair of left and right rear wheels) may be driven by a drive apparatus other than the vehicle drive apparatus 100. The drive apparatus other than the vehicle drive apparatus 100 may be, for example, any one of the following: a drive apparatus structured to transmit output torque of an internal-combustion engine (one example of a source of drive force other than a rotating electrical machine) to a pair of wheels to be driven; a drive apparatus structured to transmit output torque of a rotating electrical machine (a rotating electrical machine other than the rotating electrical machine 1 of the vehicle drive apparatus 100) to a pair of wheels to be driven, and a drive apparatus structured to transmit output torque of both an internal-combustion engine and a rotating electrical machine (a rotating electrical machine other than the rotating electrical machine 1 of the vehicle drive apparatus 100) to a pair of wheels to be driven. Alternatively, the drive apparatus other than the vehicle drive apparatus 100 may be a drive apparatus structured in the same manner as the vehicle drive apparatus 100.

As illustrated in FIG. 4, according to the present embodiment, the rotating electrical machine 1 and the inverter device 90 are arranged such that their respective placement regions in the vertical direction V overlap each other. Thus, for example, a horizontal direction H that is perpendicular to the axial direction A (in other words, a direction perpendicular to both the axial direction A and the vertical direction V) may be defined as the first direction X. In this case, as illustrated in FIG. 4, the second direction Y is parallel to the vertical direction V. As another example, a direction that is along an imaginary straight line E passing through both the first axis C1 and a center 90a of the inverter device 90 in the axial view may be defined as the first direction X. Here, the center 90a of the inverter device 90 in the axial view may be the center of gravity of a shape that defines an outline (an outer edge) of the inverter device 90 in the axial view. In the example shown in FIG. 4, the shape that defines the outline of the inverter device 90 in the axial view is a rectangular shape, and the center of gravity of the rectangular shape (specifically, the point of intersection of the diagonals) may be the center 90a of the inverter device 90 in the axial view. In the example shown in FIG. 4, the horizontal direction H, which is perpendicular to the axial direction A, and the direction along the imaginary straight line E are parallel to each other in the axial view. That is, in the example shown in FIG. 4, the above two definitions define the first direction X as the same direction as each other.

As illustrated in FIG. 4, the first output member 61 is placed between the rotating electrical machine 1 and the inverter device 90 in the first direction X at a position in the second direction Y where both the rotating electrical machine 1 and the inverter device 90 are placed. A portion of the first output member 61 between the rotating electrical machine 1 and the inverter device 90 in the first direction X is placed in such a manner as to have a placement region that overlaps the placement region of the rotating electrical machine 1 in the axial direction A and that overlaps the placement region of the inverter device 90 in the axial direction A (refer to FIG. 3). Further, as illustrated in FIG. 4, the output gear 30 is placed in such a manner as to overlap each of the rotating electrical machine 1 and the inverter device 90 in the axial view. Specifically, the output gear 30 is placed such that a portion of the output gear 30 on the first-direction first side X1 overlaps the rotating electrical machine 1 in the axial view and such that a portion of the output gear 30 on the first-direction second side X2 overlaps the inverter device 90 in the axial view. As illustrated in FIG. 3, the output gear 30 is placed on one side (specifically, the axial second side A2) with respect to both the rotating electrical machine 1 and the inverter device 90 in the axial direction A. Further, the rotating electrical machine 1 and the inverter device 90 are placed such that their respective placement regions in the axial direction A overlap each other. According to the present embodiment, in the vehicle-mounted state, at least a portion (in the example shown in FIG. 4, only a portion) of the inverter device 90 is placed on the lower side V2 with respect to the second axis C2. Alternatively, in the vehicle-mounted state, the whole of the inverter device 90 may be placed on the upper side V1 with respect to the second axis C2.

As illustrated in FIG. 4, according to the present embodiment, in the axial view, the third axis C3 is placed on the opposite side (i.e., the first-direction first side X1) of the second axis C2 from the inverter device 90 in the first direction X. According to the present embodiment, in the axial view, the third axis C3 is also placed on the first-direction first side X1 with respect to the first axis C1. Further, according to the present embodiment, in the axial view, the second axis C2 and the third axis C3 are placed on the same side (here, the second-direction second side Y2) with respect to the first axis C1 in the second direction Y That is, in the axial view, the second axis C2 is placed on the second-direction second side Y2 with respect to the first axis C1. Here, in the vehicle-mounted state, the second axis C2 is placed on the lower side V2 with respect to the imaginary straight line E in the axial view. Likewise, the third axis C3 is placed on the second-direction second side Y2 with respect to the first axis C1 in the axial view. Here, in the vehicle-mounted state, the third axis C3 is placed on the lower side V2 with respect to the imaginary straight line E in the axial view. Further, according to the present embodiment, in the axial view, the third axis C3 is placed on the opposite side of an imaginary straight line passing through both the first axis C1 and the second axis C2 from the center 90a of the inverter device 90.

As illustrated in FIG. 4, according to the present embodiment, the first output member 61 is placed in such a manner as to overlap the rotating electrical machine 1 in a view that is along the second direction Y. In other words, the first output member 61 is placed in such a manner as to have a placement region that overlaps the placement region of the rotating electrical machine 1 in the first direction X. Here, the first output member 61 is placed such that a portion of the first output member 61 on the first-direction first side X1 overlaps the rotating electrical machine 1 in the view along the second direction Y. On the other hand, according to the present embodiment, the first output member 61 is placed in such a manner as not to overlap the inverter device 90 in the view along the second direction Y. It is noted that FIG. 4 illustrates one example of the layout of components in the axial view, and this layout may be changed as appropriate. For example, the layout illustrated in FIG. 4 may be reversed in the first direction X, the layout illustrated in FIG. 4 may be reversed in the second direction Y, or the layout illustrated in FIG. 4 may be reversed both in the first direction X and in the second direction Y.

Figure 5:
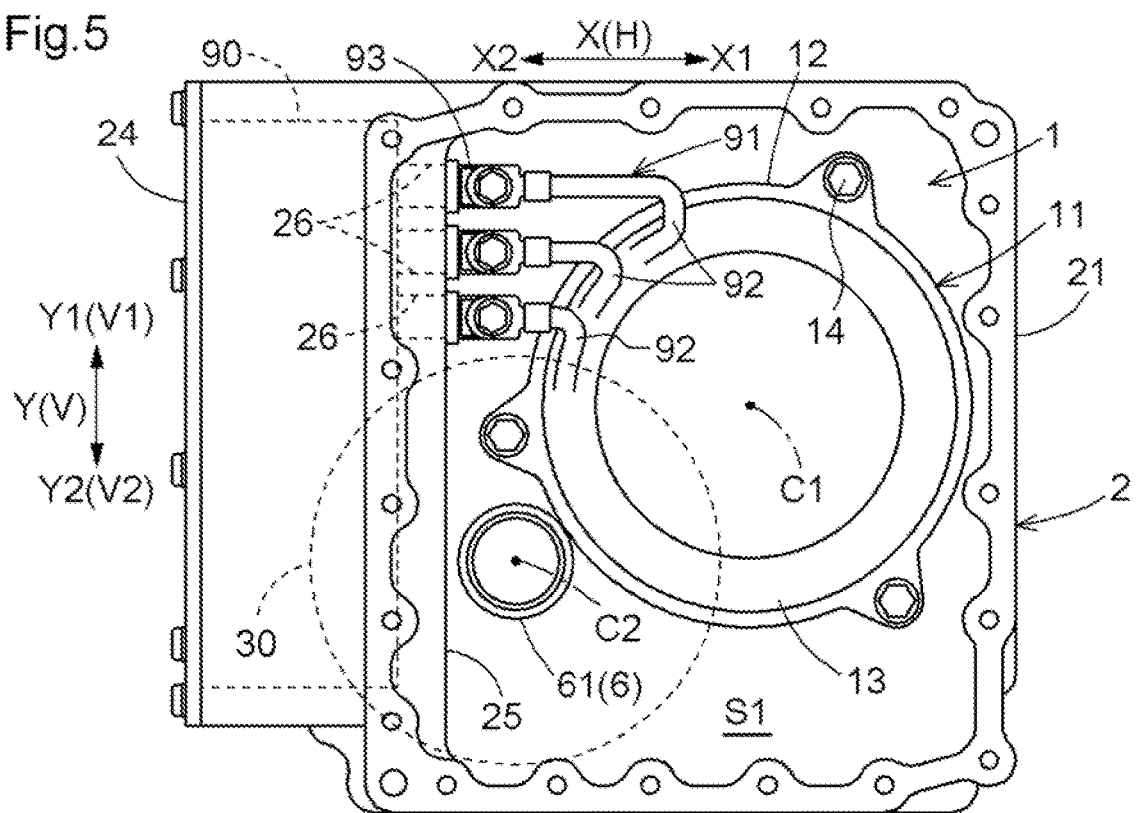
FIG. 5 is a diagram, in an axial view, illustrating the layout of components of the vehicle drive apparatus according to the embodiment.

As illustrated in FIG. 5, through holes 26 through which wiring 91 that connects the rotating electrical machine 1 and the inverter device 90 together is inserted are formed through the partition wall 25. It is noted that FIG. 4 illustrates the layout of components of the vehicle drive apparatus 100 in the axial view when the vehicle drive apparatus 100 is viewed from the axial second side A2, whereas FIG. 5 illustrates the layout of components of the vehicle drive apparatus 100 in the axial view when the vehicle drive apparatus 100 is viewed from the axial first side A1. Terminal bases having terminals 93 are attached to the through holes 26, and lead wires 92 drawn from the coil end portion 13 are electrically connected via the terminals 93 to power wires (not illustrated in the drawings) connected to the inverter device 90. The power wires, the terminals 93, and the lead wires 92 structure the wiring 91 for transmitting electrical power (electrical power used to drive the rotating electrical machine 1 and electrical power generated by the rotating electrical machine 1) between the rotating electrical machine 1 and the inverter device 90. According to the present embodiment, since the number of phases of alternating-current power that drives the rotating electrical machine 1 is "three", three lead wires 92 are provided, and three through holes 26 are formed in the partition wall 25.

As illustrated in FIG. 5, according to the present embodiment, in the vehicle-mounted state, the through holes 26 (here, all the three through holes 26) are placed between the rotating electrical machine 1 and the inverter device 90 in the first direction X in the axial view, on the upper side V1 with respect to the second axis C2 and at a height (a position in the vertical direction V) where both the rotating electrical machine 1 and the inverter device 90 are placed. It is noted that the height at which the rotating electrical machine 1 is placed includes a height at which the protruding portion of the stator core 12 described above is placed. In the example shown in FIG. 5, in the vehicle-mounted state, the through holes 26 (here, all the three through holes 26) are placed between the rotating electrical machine 1 and the inverter device 90 in the first direction X in the axial view, on the upper side V1 with respect to the first axis C1 and at the height where both the rotating electrical machine 1 and the inverter device 90 are placed.

Other Embodiments

Next, other embodiments of the vehicle drive apparatus are described.

(1) The above embodiment illustrates by example, as shown in FIG. 3, that the counter input gear 40a is placed on the axial second side A2 with respect to the counter output gear 40b. However, the present disclosure is not limited to such structure, and the counter input gear 40a may be placed on the axial first side A1 with respect to the counter output gear 40b, like the example shown in FIG. 6. In the example shown in FIG. 6, the inverter device 90 is placed in such a manner as to have a placement region that overlaps the placement region of the counter input gear 40a in the axial direction A. In this case, for example, the inverter device 90 may be placed in such a manner as to overlap the counter input gear 40a in a view that is along the vehicle front-rear direction L. When at least a portion of the inverter device 90 is placed in such a manner as to have a placement region that overlaps the placement region of the transmission mechanism 3 in the axial direction A in this way, a large space for mounting the inverter device 90 is provided more easily.

(2) The above embodiment illustrates by example that the first output member 61 is placed in such a manner as to overlap the rotating electrical machine 1 in the view along the second direction Y. However, the present disclosure is not limited to such structure, and the first output member 61 may be placed in such a manner as not to overlap the rotating electrical machine 1 in the view along the second direction Y, like the example shown in FIG. 7.

(3) The above embodiment illustrates by example that the first output member 61 is placed in such a manner as not to overlap the inverter device 90 in the view along the second direction Y. However, the present disclosure is not limited to such structure, and the first output member 61 may be placed in such a manner as to overlap the inverter device 90 in the view along the second direction Y, like the example shown in FIG. 8. Further, for example, like the example shown in FIG. 10, the first output member 61 may be placed in such a manner as to overlap each of the rotating electrical machine 1 and the inverter device 90 in the view along the second direction Y.

(4) The above embodiment illustrates by example that in the axial view, the second axis C2 and the third axis C3 are placed on the same side (in the example shown in FIG. 4, the second-direction second side Y2) of the first axis C1 in the second direction Y. However, the present disclosure is not limited to such structure, and, in the axial view, the second axis C2 and the third axis C3 may be placed on the opposite sides of the first axis C1 from each other in the second direction Y. For example, like the example shown in FIG. 9, in the axial view, the second axis C2 may be placed on the second-direction second side Y2 with respect to the first axis C1, while the third axis C3 may be placed on the second-direction first side Y1 with respect to the first axis C1. In the example shown in FIG. 9, in the axial view, the third axis C3 is placed between the first axis C1 and the second axis C2 in the first direction X. Further, in the example shown in FIG. 9, in the axial view, the third axis C3 is placed on the same side of the imaginary straight line passing through both the first axis C1 and the second axis C2 as the center 90a of the inverter device 90.

(5) The above embodiment illustrates by example that the transmission mechanism 3 is provided with the counter gear mechanism 4 in the force transmission path between the rotating electrical machine 1 and the output gear 30. However, the present disclosure is not limited to such structure, and the transmission mechanism 3 may be provided with no counter gear mechanism 4 so that the input gear 17 may mesh with the output gear 30, like the example shown in FIG. 10.

Figure 11:
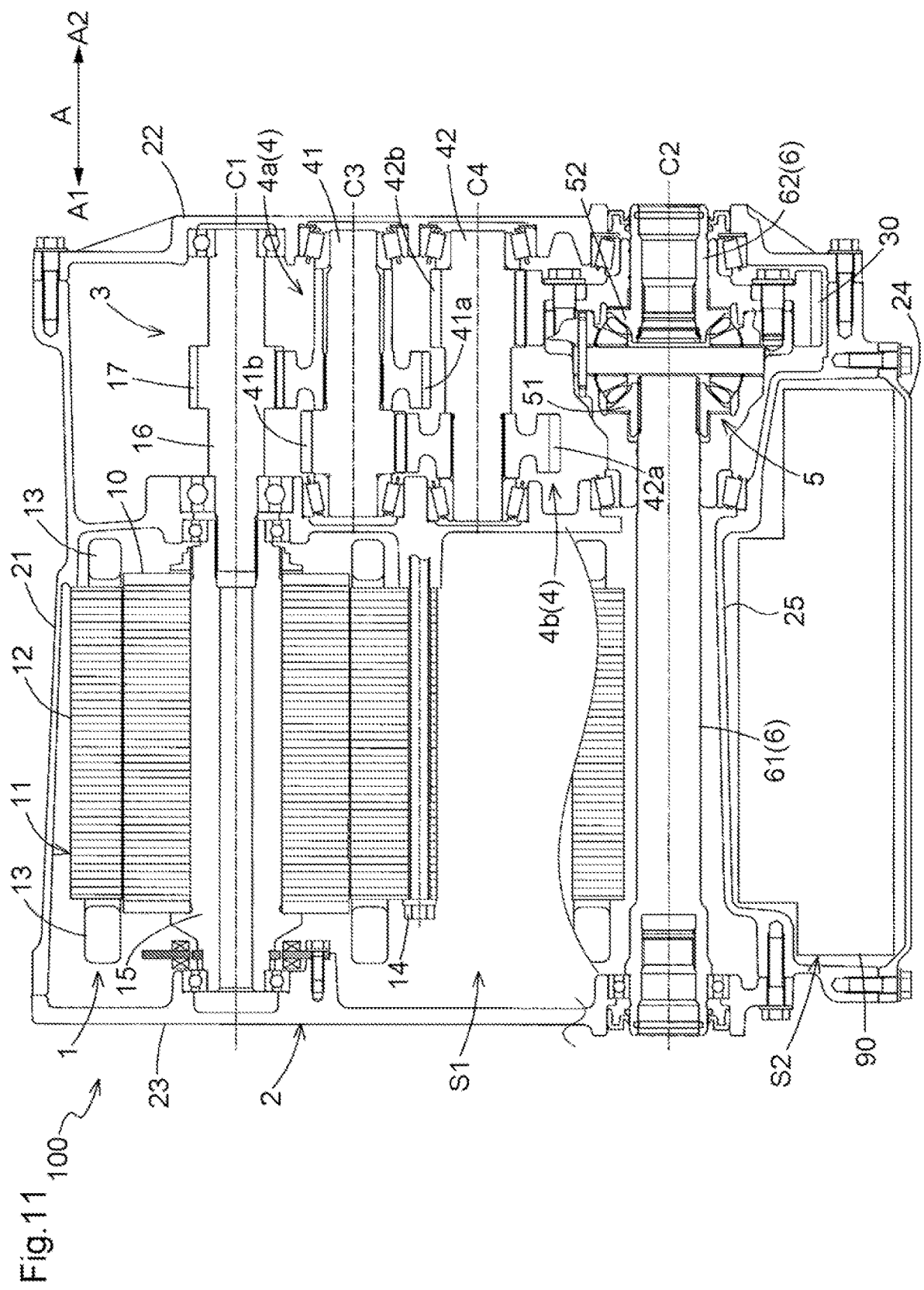
FIG. 11 is a cross-sectional view of a vehicle drive apparatus according to another embodiment.

(6) The above embodiment illustrates by example that the transmission mechanism 3 is provided with one counter gear mechanism 4. However, the present disclosure is not limited to such structure, and the transmission mechanism 3 may be provided with two counter gear mechanisms 4, like the example shown in FIG. 11 and FIG. 12. In the example shown in FIG. 11 and FIG. 12, the transmission mechanism 3 is provided with two counter gear mechanisms 4, namely, a first counter gear mechanism 4a and a second counter gear mechanism 4b. The first counter gear mechanism 4a is placed on the third axis C3, and the second counter gear mechanism 4b is placed on a fourth axis C4 that is different from the first axis C1, the second axis C2, and the third axis C3. The fourth axis C4 is an axis (an imaginary axis) parallel to the first axis C1, the second axis C2, and the third axis C3. In the example shown in FIG. 11 and FIG. 12, each of the third axis C3 and the fourth axis C4 corresponds to "a rotational axis of a counter gear mechanism".

The first counter gear mechanism 4a is provided with: a first counter input gear 41a that meshes with the input gear 17; a first counter output gear 41b, and a first counter shaft 41 that couples the first counter input gear 41a and the first counter output gear 41b together. The second counter gear mechanism 4b is provided with: a second counter input gear 42a that meshes with the first counter output gear 41b; a second counter output gear 42b that meshes with the output gear 30, and a second counter shaft 42 that couples the second counter input gear 42a and the second counter output gear 42b together. The example shown in FIG. 11 and FIG. 12 assumes that the vehicle drive apparatus 100 is mounted on the vehicle 200 in such an orientation that the axial second side A2 corresponds to the vehicle right and the axial first side A1 corresponds to the vehicle left.

Figure 12:
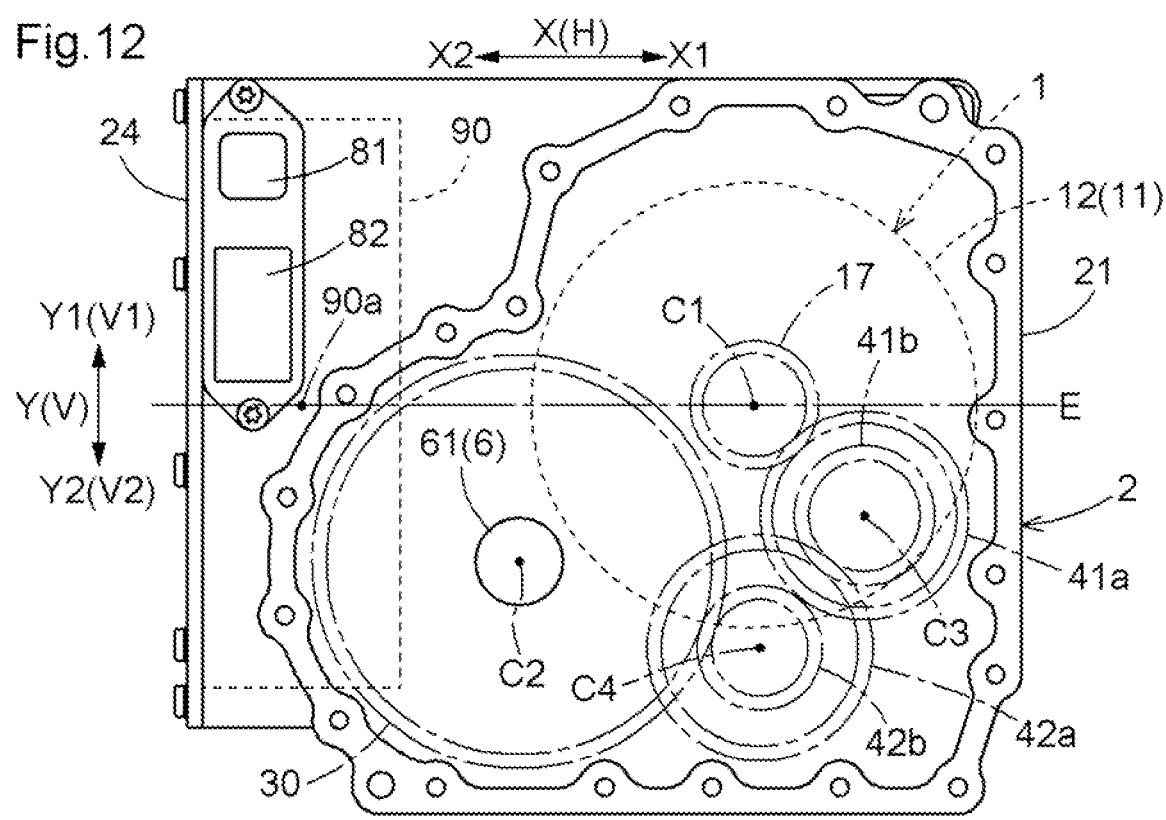
FIG. 12 is a diagram, in an axial view, illustrating the layout of components of the vehicle drive apparatus according to the other embodiment.

In the example shown in FIG. 12, in the axial view, the third axis C3 and the fourth axis C4 are placed on the opposite side (i.e., the first-direction first side X1) of the second axis C2 from the inverter device 90 in the first direction X. Further, in the example shown in FIG. 12, in the axial view, the second axis C2, the third axis C3, and the fourth axis C4 are placed on the same side (here, the second-direction second side Y2) of the first axis C1 in the second direction Y. In addition, in the example shown in FIG. 12, in the axial view, the third axis C3 and the fourth axis C4 are placed on the opposite side of the imaginary straight line passing through both the first axis C1 and the second axis C2 from the center 90a of the inverter device 90.

Figure 13:
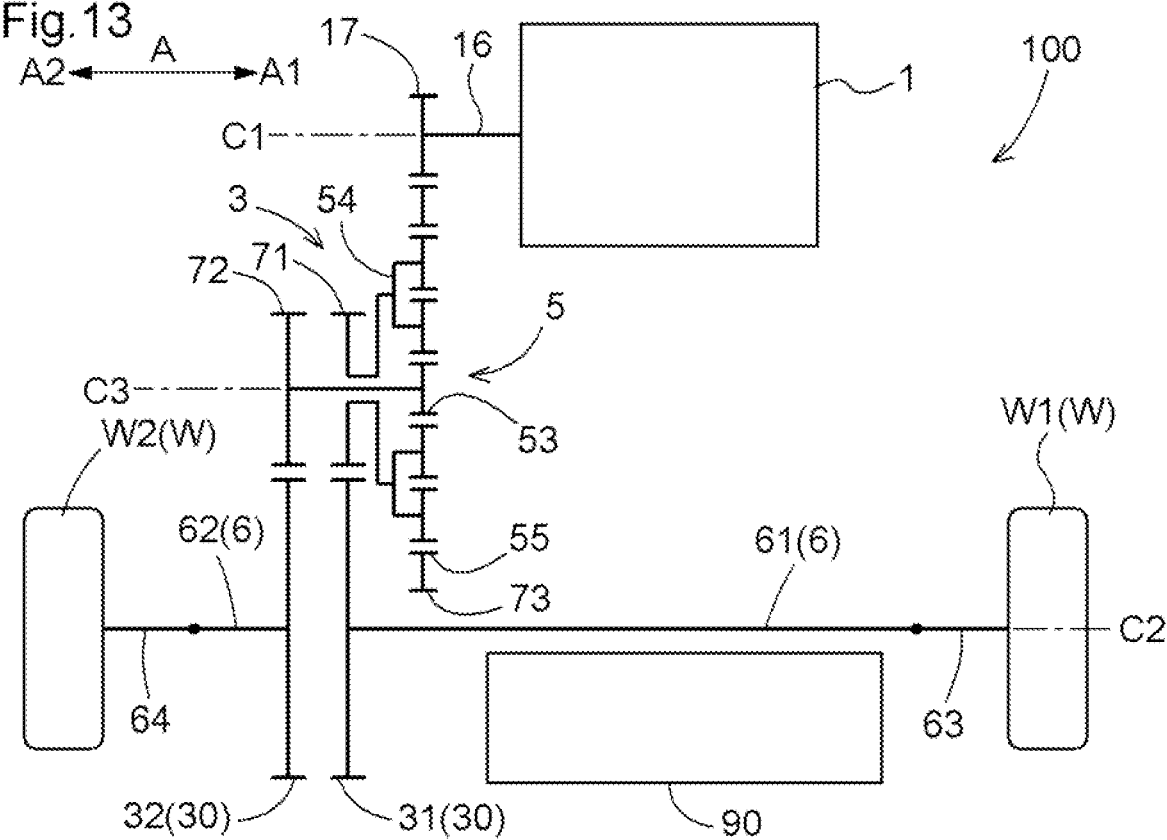
FIG. 13 is a skeleton diagram of a vehicle drive apparatus according to another embodiment.

(7) The above embodiment illustrates by example that the differential gear mechanism 5 is placed coaxially with the pair of output members 6 (i.e., on the second axis C2). However, the present disclosure is not limited to such structure, and the differential gear mechanism 5, instead of the counter gear mechanism 4, may be placed on the third axis C3, like the example shown in FIG. 13. In the example shown in FIG. 13, the differential gear mechanism 5 is a differential gear mechanism of planetary gear type. Specifically, the differential gear mechanism 5 is a double-pinion planetary gear mechanism and distributes rotation of a ring gear 55 to a sun gear 53 and a carrier 54. The transmission mechanism 3 is provided with a first output gear 31 as the output gear 30 that rotates as a unit with the first output member 61, and a second output gear 32 as the output gear 30 that rotates as a unit with the second output member 62. Further, a first gear 71 that rotates as a unit with the carrier 54 meshes with the first output gear 31, a second gear 72 that rotates as a unit with the sun gear 53 meshes with the second output gear 32, and a third gear 73 that rotates as a unit with the ring gear 55 meshes with the input gear 17.

(8) The above embodiment illustrates by example that the transmission mechanism 3 is provided with the differential gear mechanism 5 that distributes driving force transmitted from the rotating electrical machine 1, to the pair of output members 6. However, the present disclosure is not limited to such structure, and the transmission mechanism 3 may be provided with no differential gear mechanism 5. In this case, differential action of the pair of output members 6 is not allowed, so that the pair of output members 6 always rotate at the same speed.

(9) The above embodiment illustrates by example that in the vehicle-mounted state, the through holes 26 are placed between the rotating electrical machine 1 and the inverter device 90 in the first direction X in the axial view, on the upper side V1 with respect to the second axis C2 and at the height where both the rotating electrical machine 1 and the inverter device 90 are placed. However, the present disclosure is not limited to such structure, and, for example, in the vehicle-mounted state, the through holes 26 may be placed on the upper side V1 with respect to at least one of the rotating electrical machine 1 and the inverter device 90.

(10) The above embodiment illustrates by example that in the vehicle-mounted state, the inverter device 90 is placed on the middle side with respect to the rotating electrical machine 1 in the vehicle front-rear direction L. However, the present disclosure is not limited to such structure, and, for example, in the vehicle-mounted state, the rotating electrical machine 1 may be placed on the middle side with respect to the inverter device 90 in the vehicle front-rear direction L.

(11) It is noted that the structure disclosed in any one of the embodiments described above may be used in combination with the structure disclosed in any other of the embodiments (including combinations of the embodiments described as other embodiments), as long as there is no contradiction therebetween. As for other structure, the embodiments disclosed in the present description are also to be considered in all aspects as illustrative only. Therefore, various modifications that fall within the spirit of the present disclosure are possible as appropriate.

Summary of the Embodiments

Below is the summary of the vehicle drive apparatus described above.

A vehicle drive apparatus (100) is provided with: a rotating electrical machine (1); a pair of output members (6) that are drivingly coupled to a pair of wheels (W) respectively; a transmission mechanism (3) that transmits driving force between the rotating electrical machine (1) and the pair of output members (6), and an inverter device (90) that controls driving of the rotating electrical machine (1), wherein the rotating electrical machine (1) and the pair of output members (6) are separately placed on two axes (C1, C2) that are parallel to each other, the transmission mechanism (3) is provided with an output gear (30) that is drivingly coupled to at least one of the pair of output members (6) and that is placed coaxially with the pair of output members (6), a direction in which the rotating electrical machine (1) and the inverter device (90) are arranged side by side in an axial view that is along an axial direction (A) is defined as a first direction (X), a direction that is perpendicular to both the axial direction (A) and the first direction (X) is defined as a second direction (Y), a first output member (61) that is one of the pair of output members (6) is placed between the rotating electrical machine (1) and the inverter device (90) in the first direction (X), at a position in the second direction (Y) where both the rotating electrical machine (1) and the inverter device (90) are placed, and the output gear (30) is placed in such a manner as to overlap each of the rotating electrical machine (1) and the inverter device (90) in the axial view.

According to this structure, the first output member (61) is placed between the rotating electrical machine (1) and the inverter device (90) in the first direction (X), at the position in the second direction (Y) where both the rotating electrical machine (1) and the inverter device (90) are placed. Thus, the respective placement regions, in the second direction (Y), of the rotating electrical machine (1), the inverter device (90), and the output gear (30) that is placed coaxially with the first output member (61) overlap each other so that the vehicle drive apparatus (100) can be reduced in size in the second direction (Y). Further, according to this structure, the output gear (30) is placed in such a manner as to overlap both the rotating electrical machine (1) and the inverter device (90) in the axial view. Thus, while the first output member (61) is placed between the rotating electrical machine (1) and the inverter device (90) in the first direction (X) as described above, a space that overlaps the output gear (30) in the axial view is effectively used to allow the rotating electrical machine (1) and the inverter device (90) to be placed close to each other in the first direction (X). This permits a reduction in the size of the vehicle drive apparatus (100) in the first direction (X).

As described above, according to this structure, it is possible to reduce the size of the vehicle drive apparatus (100) both in the first direction (X) and in the second direction (Y), that is, to reduce the dimensions of the vehicle drive apparatus (100) in the axial view. Further, according to this structure, the rotating electrical machine (1) and the inverter device (90) are separately placed on different sides in the first direction (X) with respect to the first output member (61) placed coaxially with the output gear (30). This makes it easy to increase not only a ratio at which the rotating electrical machine (1) overlaps the output gear (30) in the axial view, but also a ratio at which the inverter device (90) overlaps the output gear (30) in the axial view, thus facilitating a reduction in the dimensions of the vehicle drive apparatus (100) in the axial view.

Here, in a state where the vehicle drive apparatus (100) is mounted on a vehicle (200), at least a portion of the inverter device (90) may be preferably placed on a lower side (V2) with respect to a rotational axis (C2) of the first output member (61).

This structure permits effective use of a dead space around the first output member (61) to place the inverter device (90), thus allowing suppression of an increase in the size of the vehicle drive apparatus (100).

Further, the first output member (61) may be preferably placed in such a manner as to overlap the rotating electrical machine (1) in a view that is along the second direction (Y).

This structure allows a reduction in the size of the vehicle drive apparatus (100) in the first direction (X), as compared to when the first output member (61) is placed in such a manner as not to overlap the rotating electrical machine (1) in the view along the second direction (Y).

Further, the first output member (61) may be preferably placed in such a manner as to overlap the inverter device (90) in a view that is along the second direction (Y).

This structure allows a reduction in the size of the vehicle drive apparatus (100) in the first direction (X), as compared to when the first output member (61) is placed in such a manner as not to overlap the inverter device (90) in the view along the second direction (Y).

Further, the output gear (30) may be preferably placed on one side with respect to both the rotating electrical machine (1) and the inverter device (90) in the axial direction (A).

This structure makes it easy to increase a ratio at which the respective placement regions of the rotating electrical machine (1) and the inverter device (90) in the axial direction (A) overlap each other, thus facilitating a reduction in the size of the vehicle drive apparatus (100) in the axial direction (A).

Further, it may be preferable that the transmission mechanism (3) be provided with a counter gear mechanism (4) in a force transmission path between the rotating electrical machine (1) and the output gear (30), and that a rotational axis (C3, C4) of the counter gear mechanism (4) be placed on an opposite side of a rotational axis (C2) of the output gear (30) from the inverter device (90) in the first direction (X) in the axial view.

This structure makes it easy to set a speed ratio between the rotating electrical machine (1) and the output gear (30) to a desired value, as compared to when the transmission mechanism (3) is not provided with the counter gear mechanism (4). Further, according to this structure, in the axial view, the rotational axis (C3, C4) of the counter gear mechanism (4) is placed on the opposite side of the rotational axis (C2) of the output gear (30) from the inverter device (90) in the first direction (X). Thus, when at least a portion of the inverter device (90) is placed in such a manner as to have a placement region that overlaps the placement region of the counter gear mechanism (4) in the axial direction (A), it is easy to place the inverter device (90)

toward the rotating electrical machine (1) in the first direction (X) while avoiding interference with the counter gear mechanism (4). Therefore, as compared to when the rotational axis (C3, C4) of the counter gear mechanism (4) is placed on the same side of the rotational axis (C2) of the output gear (30) as the inverter device (90) in the first direction (X) in the axial view, it is easy to place the rotating electrical machine (1) and the inverter device (90) close to each other in the first direction (X) so as to reduce the size of the vehicle drive apparatus (100) in the first direction (X).

When the rotational axis (C3, C4) of the counter gear mechanism (4) is placed on the opposite side of the rotational axis (C2) of the output gear (30) from the inverter device (90) in the first direction (X) in the axial view as described above, the rotational axis (C2) of the output gear (30) and the rotational axis (C3, C4) of the counter gear mechanism (4) may be preferably placed on a same side of a rotational axis (C1) of the rotating electrical machine (1) in the second direction (Y) in the axial view.

This structure makes it easy to place the counter gear mechanism (4) away from the inverter device (90) in the first direction (X), as compared to when the rotational axis (C2) of the output gear (30) and the rotational axis (C3, C4) of the counter gear mechanism (4) are placed on the opposite side of the rotational axis (C1) of the rotating electrical machine (1) from each other in the second direction (Y) in the axial view. Thus, when at least a portion of the inverter device (90) is placed in such a manner as to have a placement region that overlaps the placement region of the counter gear mechanism (4) in the axial direction (A), it is easy to place the inverter device (90) toward the rotating electrical machine (1) in the first direction (X) while avoiding interference with the counter gear mechanism (4).

When the vehicle drive apparatus (100) is structured in the above manners, it may be preferable that in a state where the vehicle drive apparatus (100) is mounted on a vehicle (200), in the axial view, a rotational axis (C2) of the output gear (30) be placed on a lower side (V2) with respect to an imaginary straight line (E) passing through both a rotational axis (C1) of the rotating electrical machine (1) and a center (90a) of the inverter device (90).

Oil for lubrication and cooling is usually sealed in the case (2) of the vehicle drive apparatus (100). This structure makes it possible that the output gear (30) is placed toward the lower side (V2) while the rotating electrical machine (1) is placed toward an upper side (V1). Thus, it is possible to properly lubricate the output gear (30) or a member placed coaxially therewith while reducing oil stirring loss that is caused by rotation of the rotating electrical machine (1).

Further, it may be preferable that the vehicle drive apparatus (100) be provided with a case (2) that houses the rotating electrical machine (1), and that the rotating electrical machine (1) and the first output member (61) be held in a common holding chamber (S1) that the case (2) has.

This structure makes it easy to place the rotating electrical machine (1) and the first output member (61) close to each other, as compared to when the rotating electrical machine (1) and the first output member (61) are held in separate holding chambers, thus allowing suppression of an increase in the size of the vehicle drive apparatus (100).

When the rotating electrical machine (1) and the first output member (61) are held in the common holding chamber (S1), it may be preferable that: the holding chamber (S1) be defined as a first holding chamber (S1); the case (2) be provided with the first holding chamber (S1), a second holding chamber (S2) that holds the inverter device (90), and a partition wall (25) that separates the first holding chamber (S1) and the second holding chamber (S2) from each other; and the first holding chamber (S1) and the second holding chamber (S2) be integrally formed with the case (2).

This structure permits one partition wall (25) to be used as a wall that separates the first holding chamber (S1) and the second holding chamber (S2) from each other, thus allowing suppression of an increase in the size of the vehicle drive apparatus (100).

When the vehicle drive apparatus (100) is structured in the above manners, it may be preferable that: the vehicle drive apparatus (100) be provided with a case (2) that houses both the rotating electrical machine (1) and the inverter device (90); the case (2) be provided with a first holding chamber (S1) that holds the rotating electrical machine (1), a second holding chamber (S2) that holds the inverter device (90), and a partition wall (25) that separates the first holding chamber (S1) and the second holding chamber (S2) from each other; a through hole (26) through which wiring (91) that connects the rotating electrical machine (1) and the inverter device (90) together is inserted be formed through the partition wall (25); and in a state where the vehicle drive apparatus (100) is mounted on a vehicle (200), the through hole (26) be placed between the rotating electrical machine (1) and the inverter device (90) in the first direction (X) in the axial view, on an upper side (V1) with respect to a rotational axis (C2) of the output gear (30) and at a height where both the rotating electrical machine (1) and the inverter device (90) are placed.

According to this structure, the through hole (26) that is formed in the partition wall (25) and through which the wiring (91) is inserted is placed on the upper side (V1) with respect to the rotational axis (C2) of the output gear (30). Thus, when oil for lubrication and cooling is stored in the first holding chamber (S1) that holds the rotating electrical machine (1), it is easy to place the through hole (26) on the upper side (V1) away from the surface of the oil. Therefore, it is easy to provide sealing performance of the through hole (26). Further, according to this structure, since the through hole (26) through which the wiring (91) that connects the rotating electrical machine (1) and the inverter device (90) together is inserted is placed between objects to be connected by the wiring (91) in the first direction (X), it is easy to shorten the length of the wiring (91).

Further, it may be preferable that in a state where the vehicle drive apparatus (100) is mounted on a vehicle (200), the inverter device (90) be placed on a middle side with respect to the rotating electrical machine (1) in a front-rear direction (L) of the vehicle.

This structure makes it easy to protect the inverter device (90) from impact loads in the event of a frontal or rear collision of the vehicle (200).

Further, it may be preferable that the transmission mechanism (3) be provided with a differential gear mechanism (5) and that the differential gear mechanism (5) distribute the driving force transmitted from the rotating electrical machine (1), to the pair of output members (6).

This structure allows differential action of the pair of output members (6), thus being capable of providing adequate turning performance of the vehicle (200).

When the transmission mechanism (3) is provided with the differential gear mechanism (5) as described above, it may be preferable that the differential gear mechanism (5) be placed coaxially with the pair of output members (6) and distribute the driving force transmitted from the rotating electrical machine (1) to the output gear (30), to the pair of output members (6).

This structure allows rotational speed ranges of rotating members that structure the differential gear mechanism (5) to be low, when the transmission mechanism (3) is structured to transmit rotation of the rotating electrical machine (1) to the pair of output members (6) while reducing the rotational speed. Thus, it is easy to provide durability of the differential gear mechanism (5).

Achieving at least one of the effects described above meets the requirements of a vehicle drive apparatus according to the present disclosure.

DESCRIPTION OF THE REFERENCE NUMERALS

1: ROTATING ELECTRICAL MACHINE
2: CASE
3: TRANSMISSION MECHANISM
4: COUNTER GEAR MECHANISM
5: DIFFERENTIAL GEAR MECHANISM
6: OUTPUT MEMBER
25: PARTITION WALL
26: THROUGH HOLE
30: OUTPUT GEAR
61: FIRST OUTPUT MEMBER
90: INVERTER DEVICE
90a: CENTER OF INVERTER DEVICE
91: WIRING
100: VEHICLE DRIVE APPARATUS
200: VEHICLE
A: AXIAL DIRECTION
C1: FIRST AXIS (ROTATIONAL AXIS OF ROTATING ELECTRICAL MACHINE)
C2: SECOND AXIS (ROTATIONAL AXIS OF OUTPUT GEAR, ROTATIONAL AXIS OF FIRST OUTPUT MEMBER)
C3: THIRD AXIS (ROTATIONAL AXIS OF COUNTER GEAR
   MECHANISM)
C4: FOURTH AXIS (ROTATIONAL AXIS OF COUNTER GEAR MECHANISM)
E: IMAGINARY STRAIGHT LINE
L: VEHICLE FRONT-REAR DIRECTION
S1: FIRST HOLDING CHAMBER
S2: SECOND HOLDING CHAMBER
V1: UPPER SIDE
V2: LOWER SIDE
W: WHEEL
X: FIRST DIRECTION
Y: SECOND DIRECTION.

The invention claimed is:

1. A vehicle drive apparatus comprising:
a rotating electrical machine;
a pair of output members that are drivingly coupled to a pair of wheels respectively;
a transmission mechanism that transmits driving force between the rotating electrical machine and the pair of output members; and
an inverter device that controls driving of the rotating electrical machine, wherein
the rotating electrical machine and the pair of output members are separately placed on two axes that are parallel to each other,
the transmission mechanism is provided with an output gear that is drivingly coupled to at least one of the pair of output members and that is placed coaxially with the pair of output members,
a direction in which the rotating electrical machine and the inverter device are arranged side by side in an axial view that is along an axial direction is defined as a first direction,
a direction that is perpendicular to both the axial direction and the first direction is defined as a second direction,
a first output member that is one of the pair of output members is placed between the rotating electrical machine and the inverter device in the first direction, at a position in the second direction where both the rotating electrical machine and the inverter device are placed, wherein
the output gear is placed in such a manner as to overlap each of the rotating electrical machine and the inverter device in the axial view,
the transmission mechanism is provided with a counter gear mechanism placed as another axis relative to the rotating electrical machine and the output gear, the counter gear mechanism for transmitting driving force between the rotating electrical machine and the output gear, and
in the axial view, a rotational axis of the counter gear mechanism is placed on an opposite side of a rotational axis of the output gear from the inverter device in the first direction.

2. The vehicle drive apparatus according to claim 1, wherein the transmission mechanism is further provided with an input member driven by the rotating electrical machine and an input gear integrally rotating with the input member, the counter gear mechanism is provided with a counter input gear in mesh with the input gear and a counter output gear in mesh with the output gear, and
the inverter device is placed in such a manner as to have a placement region that overlaps with a placement region of the counter input gear in the axial direction.

3. The vehicle drive apparatus according to claim 1, wherein in the axial view, the rotational axis of the output gear and the rotational axis of the counter gear mechanism are placed on a same side of a rotational axis of the rotating electrical machine in the second direction.

4. The vehicle drive apparatus according to claim 2, wherein in the axial view, the rotational axis of the output gear and the rotational axis of the counter gear mechanism are placed on a same side of a rotational axis of the rotating electrical machine in the second direction.

5. The vehicle drive apparatus according to claim 1, wherein in a state where the vehicle drive apparatus is mounted on a vehicle, at least a portion of the inverter device is placed on a lower side with respect to a rotational axis of the first output member.

6. The vehicle drive apparatus according to claim 2, wherein in a state where the vehicle drive apparatus is mounted on a vehicle, at least a portion of the inverter device is placed on a lower side with respect to a rotational axis of the first output member.

7. The vehicle drive apparatus according to claim 3, wherein in a state where the vehicle drive apparatus is mounted on a vehicle, at least a portion of the inverter device is placed on a lower side with respect to a rotational axis of the first output member.

8. The vehicle drive apparatus according to claim 4, wherein in a state where the vehicle drive apparatus is mounted on a vehicle, at least a portion of the inverter device is placed on a lower side with respect to a rotational axis of the first output member.

9. The vehicle drive apparatus according to claim 1, wherein the first output member is placed in such a manner as to overlap the inverter device in a view that is along the second direction.

10. The vehicle drive apparatus according to claim 2, wherein the first output member is placed in such a manner as to overlap the inverter device in a view that is along the second direction.

11. The vehicle drive apparatus according to claim 6, wherein the first output member is placed in such a manner as to overlap the inverter device in a view that is along the second direction.

12. The vehicle drive apparatus according to claim 3, wherein the first output member is placed in such a manner as to overlap the inverter device in a view that is along the second direction.

13. The vehicle drive apparatus according to claim 7, wherein the first output member is placed in such a manner as to overlap the inverter device in a view that is along the second direction.

14. The vehicle drive apparatus according to claim 4, wherein the first output member is placed in such a manner as to overlap the inverter device in a view that is along the second direction.

15. The vehicle drive apparatus according to claim 8, wherein the first output member is placed in such a manner as to overlap the inverter device in a view that is along the second direction.

16. The vehicle drive apparatus according to claim 5, wherein the first output member is placed in such a manner as to overlap the inverter device in a view that is along the second direction.

17. The vehicle drive apparatus according to claim 1, wherein the output gear is placed on one side with respect to both the rotating electrical machine and the inverter device in the axial direction.

18. The vehicle drive apparatus according to claim 15, wherein the output gear is placed on one side with respect to both the rotating electrical machine and the inverter device in the axial direction.

19. The vehicle drive apparatus according to claim 1, wherein in a state where the vehicle drive apparatus is mounted on a vehicle, in the axial view, a rotational axis of the output gear is placed on a lower side with respect to an imaginary straight line passing through both a rotational axis of the rotating electrical machine and a center of the inverter device.

20. The vehicle drive apparatus according to claim 18, wherein in a state where the vehicle drive apparatus is mounted on a vehicle, in the axial view, a rotational axis of the output gear is placed on a lower side with respect to an imaginary straight line passing through both a rotational axis of the rotating electrical machine and a center of the inverter device.

* * * * *